United States Patent
Joseph, II

(10) Patent No.: US 6,795,633 B2
(45) Date of Patent: Sep. 21, 2004

(54) METHOD AND APPARATUS FOR HANDLING OPTICAL COMPONENTS

(75) Inventor: Michael A. Joseph, II, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/391,739

(22) Filed: Mar. 19, 2003

(65) Prior Publication Data

US 2004/0013391 A1 Jan. 22, 2004

Related U.S. Application Data

(60) Provisional application No. 60/369,092, filed on Mar. 28, 2002.

(51) Int. Cl.[7] ................................................. G02B 6/00
(52) U.S. Cl. ......................................... 385/135; 385/137
(58) Field of Search .......................... 385/25, 134, 135, 385/136, 137, 139

(56) References Cited

U.S. PATENT DOCUMENTS 6,580,867 B2 * 6/2003 Daoud et al. ................ 385/135
6,674,952 B2 * 1/2004 Howell et al. ............... 385/135

\* cited by examiner

Primary Examiner—Chandrika Prasad
(74) Attorney, Agent, or Firm—Svetlana Z. Short

(57) ABSTRACT

One aspect of the invention is a package for an optical component having at least one optical waveguide fiber extending therefrom. The package includes a base and a component holder removably engageable with the base. The component holder includes a receptacle configured to receive the optical component and the component holder is rotatable with respect to the base.

13 Claims, 10 Drawing Sheets

METHOD AND APPARATUS FOR HANDLING OPTICAL COMPONENTS

CROSS-REFERENCE TO RELATED APPLICATIONS

The present application claims priority under 35 U.S.C. 119(e) to U.S. Provisional Patent Application Ser. No. 60/369,092, filed Mar. 28, 2002 entitled "Method and Apparatus for Handling Optical Components." The aforementioned application is hereby incorporated herein by reference in its entirety.

BACKGROUND OF THE INVENTION

1. Field of the Invention

The present invention relates generally to packaging optical components, and particularly to packaging optical components having optical waveguide fibers extending therefrom.

2. Technical Background

The transporting of optical components and the building of optical devices, such as, for example optical amplifiers, have historically involved a great deal of manual processes. Many of these processes require technicians to manipulate the optical waveguide fibers or pigtails that extend from optical components using only their hands. Inherent in this manual handling of these optical fibers is the risk of damage to the optical fibers. At these times the optical waveguide fibers may be forced into shapes having radii of curvature that are smaller than the minimum allowable bend radius of the optical waveguide fiber. When the minimum bend radius of an optical waveguide is exceeded, i.e. the optical fiber is formed into a shape having a radius of curvature smaller than the minimum allowable bend radius of the optical waveguide fiber, the optical and/or mechanical properties of the optical fiber may become degraded. As a result of this degradation of the optical and/or mechanical properties of the optical fiber, the optical waveguide fiber may be unsuitable for use, even if the fiber appears undamaged to the naked eye. The degradation of the optical waveguide fiber may only become apparent after assembly of the optical component or device is completed or worse, after the component or device has been installed into an optical communication system. Therefore there is a need for technologies that reduce the amount of handwork required in both the transporting of optical components and the assembly of optical devices.

SUMMARY OF THE INVENTION

One aspect of the invention is a package for an optical component having at least one optical waveguide fiber extending therefrom. The package includes a base and a component holder removably engageable with the base. The component holder includes a receptacle configured to receive the optical component and the component holder is rotatable with respect to the base.

In another aspect, the present invention includes a package for an optical component. The package includes a base, the base defining an axis of rotation and a rotatable member removably engageable with the base. The rotatable member includes a fiber winding surface and a receptacle. The receptacle is configured to receive the optical component. The optical component has a length of optical waveguide fiber extending therefrom, and the rotatable member is rotatable about the axis of rotation.

In another aspect, the present invention includes a package for an optical component having at least one optical waveguide fiber extending therefrom. The package includes a base, the base including a receptacle. The package further includes a rotatable member disposed within the receptacle. The rotatable member includes a fiber winding track and an optical component mounting member whereby the optical component is removably engageable with the rotatable member. The package further includes a lid removably engageable with the base. When the lid is in a fist position the rotatable member is confined to substantially rotational motion within said receptacle.

In another aspect, the present invention includes a package for an optical component having an optical waveguide fiber extending therefrom. The package includes a base. The base includes a first fiber guide and a receptacle. The package further includes a rotating member removably engageable with the receptacle. The rotating member includes an optical fiber winding track. The rotating member is rotatable within the receptacle and the optical component is detachably coupled to the rotating member.

In another aspect, the present invention includes a tool for manufacturing optical devices. The tool includes a base. The base includes a handle, an optical fiber guide track disposed within the handle and an arcuate surface coupled to a first end of the handle, the arcuate surface defining a cavity. The tool further includes a rotatable member disposed within the cavity. The rotatable member includes an optical device holder and an optical fiber winding track circumscribing the optical device holder.

In another aspect, the present invention includes a method for packaging an optical component having a length of optical fiber extending therefrom. The method includes the step of providing an optical component having a length of optical fiber extending therefrom. The method further includes the step of providing a rotatable member. The rotatable member included a receptacle for receiving the optical component. The method further includes the step of providing a base. The base includes a depression for receiving the rotatable member. The method further includes the steps of placing the optical component in the receptacle and rotating the rotatable member within the depression thereby winding the length of optical fiber about the rotating member.

In another aspect, the present invention includes a method for assembling an optical device. The method includes the step of providing a plurality of optical components, each of the plurality of optical components having at least one optical waveguide fiber extending therefrom, wherein each of the plurality of optical component is detachably mounted to a rotatable component holder, wherein each of the at least one optical waveguide fibers corresponding to each of the plurality of optical components is wound around the rotatable component holder. The method further includes the steps of connecting the plurality of optical components in a predetermined relationship one to another thereby forming an optical device. The step of connecting the plurality of optical components includes the step of unwinding at least a portion of portion of at least one of the at least one optical waveguide fibers from the rotatable component holder around which the at least one optical waveguide fiber is wound. The step of connecting the plurality of optical components includes the step of coupling at least two of the at least one optical fibers extending from each of the plurality of optical components to one another.

In another aspect, the present invention includes a method for assembling an optical amplifier. The method includes the step of providing a pump laser, the pump laser having a first optical waveguide fiber extending therefrom, wherein the pump laser is detachably coupled to a first component holder, wherein the first optical waveguide fiber is wound about the first component holder. The method further includes the step of providing an amplifying optical waveguide fiber having a core doped with rare earth elements, wherein when the core is irradiated by light having a first wavelength, and strength of an optical signal having a second wavelength propagating through the optical waveguide fiber is amplified. The method further includes the step of providing an optical coupler, the coupler having a first end an a second end, the first end having a second and a third optical waveguide fiber extending therefrom, and the second end having a fourth optical waveguide fiber extending therefrom; wherein the optical coupler is detachable coupled to a second component holder; wherein the second, third and fourth optical waveguide fibers are wound about the second component holder. The method further includes the step of unwinding at least a portion of the first optical waveguide fiber from the first component holder. The method further includes the steps of unwinding at least a portion of the second optical waveguide fiber from the second component holder and coupling the first optical waveguide fiber to the second optical waveguide fiber. The method further includes the steps of unwinding at least a portion of the fourth optical waveguide fiber and coupling the fourth optical waveguide fiber to the amplifying optical waveguide fiber.

In another aspect, the present invention includes a method for packaging an optical component having at least one optical fiber extending therefrom. The method includes the step of providing a component holder, the component holder including a surface for winding the at least one optical fiber on, wherein the surface is an arcuate surface having a radius of curvature larger than the minimum bend radius of the at least one optical fiber. The method further includes the step of placing the optical component into removable engagement with the component holder. The method further includes the step of providing a housing. The housing is configured to removably receive the component holder, wherein the housing includes an arcuate surface that in cooperation with the arcuate surface defines a fiber storage region. The method further includes the steps of placing the component holder into the housing and rotating the component holder, thereby winding at least a portion of the at least one optical fiber about the arcuate surface, thereby placing at least a portion of the at least one optical fiber within the fiber storage region.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely examples of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
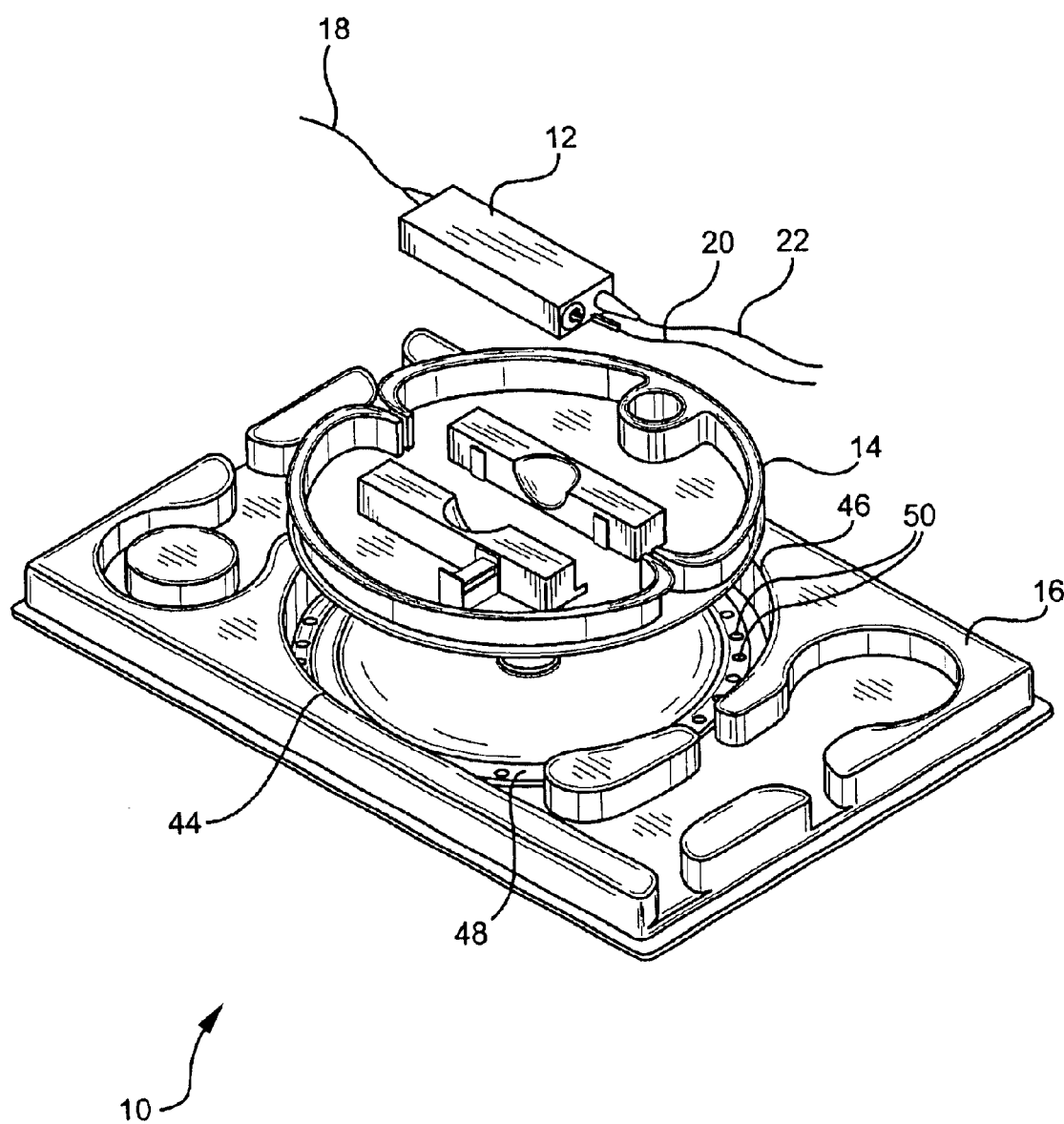
FIG. 1 is an exploded perspective view of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. An embodiment of the package for an optical component of the present invention is shown in FIG. 1, and is designated generally throughout by the reference numeral 10.

As embodied herein and depicted in FIG. 1, the package 10 for an optical component 12 includes a component holder 14 removably engageable with a base 16. As shown, the optical component 12 has three optical waveguide fibers 18, 20, 22 extending therefrom. As will be appreciated by those skilled in the art of optical communications systems, however, that the optical component 12 may have any number of optical fibers extending therefrom and the present invention may be readily configured for use with an optical component having more or less optical waveguide fibers extending therefrom, than the three optical waveguide fibers illustrated in FIG. 1.

Figure 2:
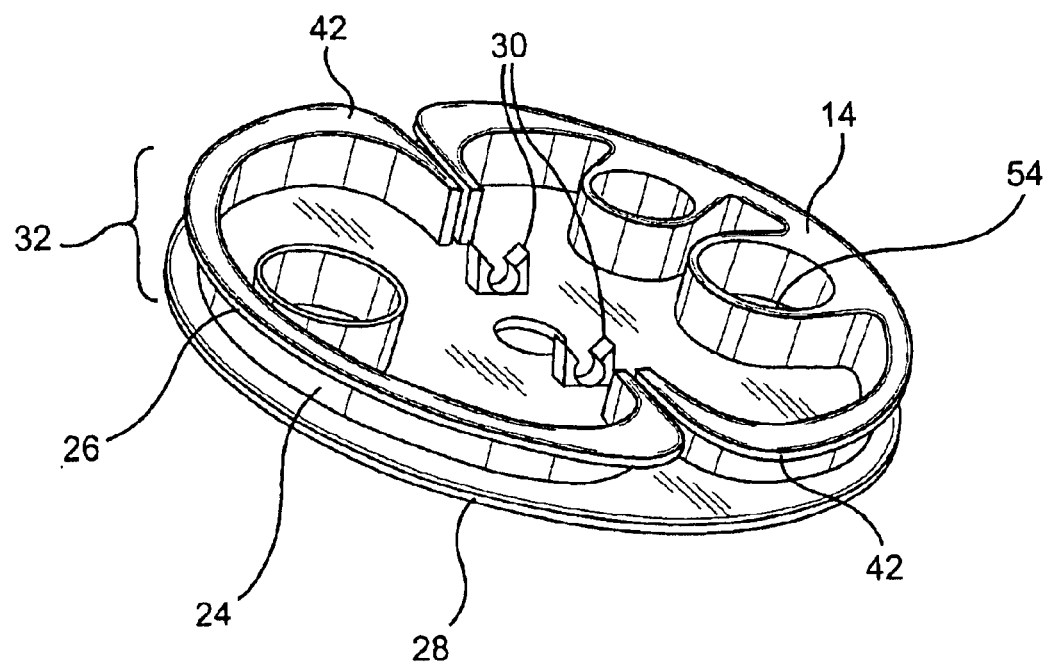
FIG. 2 is a perspective view of a component holder.

Turning now to FIG. 2, which shows a perspective view of an embodiment of the component holder 14 shown in FIG. 1, the component holder 14 includes an arcuate surface 24 bounded by two radially extending flanges 26, 28 and a mount 30 for the optical component 12. The radially extending flanges 26, 28 in cooperation with the arcuate surface 24 together define a fiber winding track 32.

The mount 30 is disposed in the interior portion of the component holder 14. As shown in FIG. 2 the mount 30 includes opposed resilient fingers that secure the optical component in a predetermined position while still allowing the optical component 12 to be removed from the mount 30 at a later time without damaging either the mount 30 or the optical component. Such a mounting system is advantageous if the optical component 12 is tubular in shape, such as, for example a packaged grating or coupler.

Figure 5:
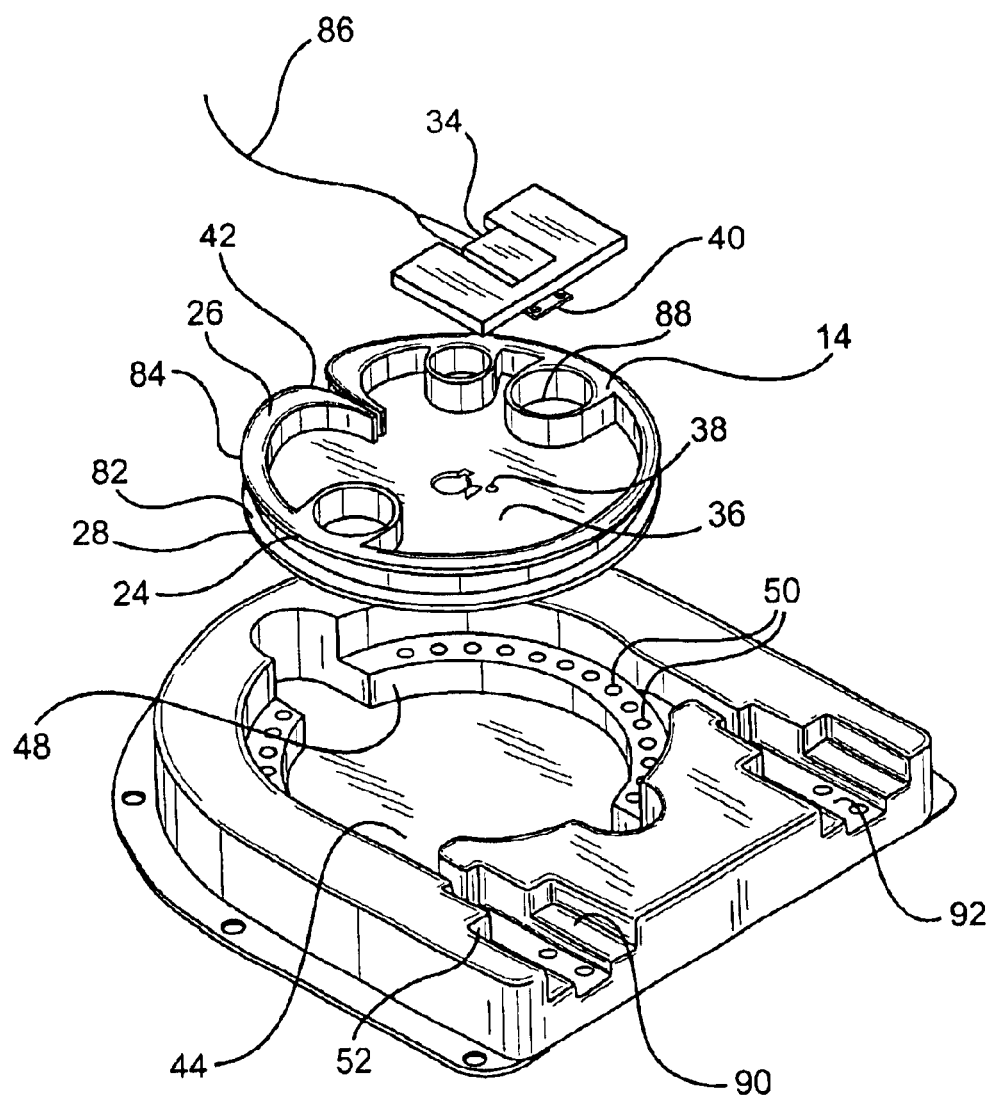
FIG. 5 is a perspective view of another embodiment of the present invention.

Turning to FIG. 5, a component holder 14 configured for securing a pump laser 34 is shown. The mount 30 includes a planar surface 36 having at least one protrusion 38 that engages a complementary structure, such as, for example, a recess or hole 40, on the pump laser 34, thereby securing the pump laser 34 in a predetermined position and orientation.

Returning to FIG. 2, the component holder 14 also includes a pair of fiber guides 42a, 42b. The fiber guides 42a, 42b are disposed opposite one another and provide access to the interior portion of the component holder 14. The fiber guides 42a, 42b are positioned to in coordination with the mount 30 so that when the optical component 12 is placed in the mount 30 the optical waveguide fibers 18, 20, 22 may be placed into the fiber guides 42a, 42b without damaging the optical waveguide fibers 18, 20, 22. The fiber guides 42 are configured to ensure that an optical fiber extending from the optical component 12 and wound about the arcuate surface 24 is not formed into a shape having a radius of curvature less than the minimum bend radius of the optical waveguide fibers 18, 20, 22.

The component holder 14 may also include a finger hole 54. The finger hole 54 provides a way for the component holder 14 to be manually rotated within the receptacle 44 by a technician. Alternatively, the finger hole 54 may be configured for engagement with a mechanical drive system (not shown) for rotating the component holder 14 within the receptacle 44. In an alternative embodiment, the finger hole 54 is fitted with a magnetic component (not shown), such as, for example a magnet or a piece of iron or steel, that allows the component holder 14 to be selectively driven by a rotational drive system by way of a magnetic coupling between the magnetic component and a corresponding magnetic component in the rotational drive system.

The component holder 14 is preferably an injection molded plastic article.

Returning to FIG. 1, the base 16 is configured to receive the component holder 14 and to allow the component holder 12 to rotate with respect to the base 14. In the embodiment of the present invention shown in FIG. 1 the component holder 14 fits into a receptacle 44 in the base 16. The receptacle 44 may be for example, a circular depression as shown in FIG. 1. The side wall 46 of the receptacle 44 is preferably an arcuate surface that in cooperation with the fiber winding track 32 forms a compartment for housing the optical waveguide fibers 18, 20, 22 when they are wound about the component holder 14.

In one embodiment, the receptacle 44 includes a depressed annular plateau 48. The component holder 14 rotates on the depressed annular plateau 48 with in the receptacle 44. In one embodiment, the depressed annular plateau 48 includes a multiple depressions 50 and the component holder 14 includes at least one protrusion that is configured to engage the multiple depressions 50 thereby providing a detent.

The base 16 further includes two fiber guide passageways 52a, 52b disposed opposite one another, that intersect the receptacle 44. The transition between the two fiber guide passageways 52a, 52b and the receptacle 44 are radiused, with the radius larger than the minimum bend radii of the optical waveguide fibers 18, 20, 22.

Preferably, the base 16 is a molded plastic article. As will be appreciated by those of ordinary skill in the art of forming plastics, the base 16 may be made by a number of processes such as for example, thermoforming or injection molding.

The package 10 for an optical component 12 may be advantageously used as follows. The optical component 12 is coupled to the mount 30 of the component holder 14 so that the optical waveguide fibers 18, 20, 22 extend through the fiber guides 42a, 42b. The component holder 14 is then placed in the receptacle 44. The component holder 14 is oriented with respect to the base 16 so that the optical waveguide fibers 18, 20, 22 extend through the two fiber guide passageways 52a, 52b. The component holder 14 is then rotated until a predetermined length of the optical waveguide fibers 18, 20, 22 are wound about the arcuate surface 24. In many cases the component holder 14 is rotated until all of the optical waveguide fibers 18, 20, 22 are contained within the compartment formed by the side wall 46 of the receptacle 44 and the fiber winding track 32. With the optical waveguide fibers 18, 20, 22 thus protected, the optical component 12 is ready for transportation or storage within the package 10. To access the optical waveguide fibers 18, 20, 22 for either testing the optical component 12 or assembling the optical component 12 into an optical device by simply removing the component holder 14 from the receptacle 44. The inherent resiliency of the optical waveguide fibers 18, 20, 22 will unwind the optical waveguide fibers 18, 20, 22 from the component holder without the optical waveguide fibers 18, 20, 22 being touched by either a technician or a machine.

Figure 3:
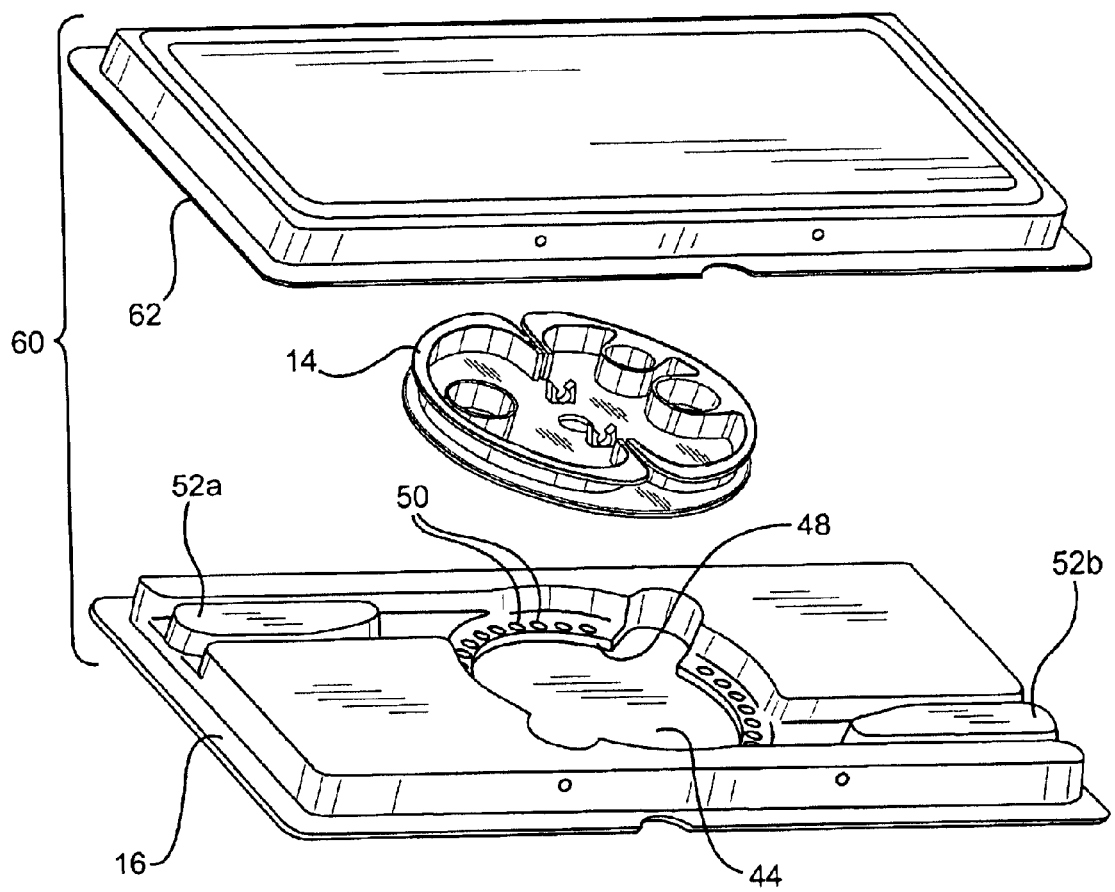
FIG. 3 is an exploded perspective view of a second embodiment of the present invention.

In another embodiment, as shown in FIG. 3, the present invention for a package 60 for an optical component 12 having at least one optical waveguide fiber extending therefrom. The package 60 includes a component holder 14 a base 16 and a lid 62. The package 60 is particularly advantageous for the transportation and storage of optical components.

The base 16 is configured to receive the component holder 14 and to allow the component holder 12 to rotate with respect to the base 14. In the embodiment of the present invention shown in FIG. 1 the component holder 14 fits into a receptacle 44 in the base 16. The receptacle 44 may be for example, a circular depression as shown in FIG. 1. The side wall 46 of the receptacle 44 is preferably an arcuate surface that in cooperation with the fiber winding track 32 forms a compartment for housing the optical waveguide fibers 18, 20, 22 when they are wound about the component holder 14.

In one embodiment, the receptacle 44 includes a depressed annular plateau 48. The component holder 14 rotates on the depressed annular plateau 48 with in the receptacle 44. In one embodiment, the depressed annular plateau 48 includes a multiple depressions 50 and the component holder 14 includes at least one protrusion that is configured to engage the multiple depressions 50 thereby providing a detent.

The base 16 further includes two fiber guide passageways 52a, 52b disposed intersect the receptacle 44. The transition between the two fiber guide passageways 52a, 52b and the receptacle 44 are radiused, with the radius larger than the minimum bend radii of the optical waveguide fibers 18, 20, 22.

Preferably, the base 16 is a molded plastic article. As will be appreciated by those of ordinary skill in the art of forming plastics, the base 16 may be made by a number of processes such as for example, thermoforming or injection molding.

The package 30 further includes a lid 62 that is removably engageable with the base 36. When the lid 46 is in a fist position the rotatable member 40 is confined to substantially rotational motion within the receptacle 38. In one embodiment, the lid 62 is made from a thin plastic. The lid may be configured with openings 64 that align with the ends 66, 68 of the fiber guide passageways 52a, 52b when the lid 14 is engaged with the base 16. These openings are used when it is desirable to access the optical waveguide fibers extending from the optical component 12, without removing the component holder 14 from the base 16. In this configuration, the optical waveguide fibers are not completely wound about the component holder 14. At least a portion of selected optical waveguide fibers is left to extend beyond the edges of the base 16. Lengths of these optical waveguide fibers may then be extended and retracted within the package 60 by selective rotation of the component holder 14 within the receptacle 44. The lid 62 provides additional protection to the optical component 12 and the optical fibers extending therefrom.

In this embodiment, the component holder 14 is preferably fitted with a magnetic component (not shown), such as, for example a magnet or a piece of iron or steel, that allows the component holder 14 to be selectively driven by a rotational drive system by way of a magnetic coupling between the magnetic component and a corresponding magnetic component in the rotational drive system. Thus, the component holder 14 may be selectively rotated while the lid 62 is engaged with the base 16.

The package 60 for an optical component 12 may be advantageously used as follows. The optical component 12 is coupled to the mount 30 of the component holder 14 so that the optical waveguide fibers extend through the fiber guides 42a, 42b. The component holder 14 is then placed in the receptacle 44. The component holder 14 is oriented with respect to the base 16 so that the optical waveguide fibers extending therefrom extend through the two fiber guide passageways 52a, 52b. The lid 62 is then engaged with the base. Alternatively, the engagement of the lid 62 with the base 16 may be delayed until after the optical waveguide fibers are wound about the component holder 14. The component holder 14 is then rotated until a predetermined length of the optical waveguide fibers 18, 20, 22 are wound about the arcuate surface 24. In many cases the component holder 14 is rotated until all of the optical waveguide fibers 18, 20, 22 are contained within the compartment formed by the side wall 46 of the receptacle 44 and the fiber winding track 32. With the optical waveguide fibers 18, 20, 22 thus protected, the optical component 12 is ready for transportation or storage within the package 60.

The package 60 of the present embodiment provides at least two ways of accessing the optical waveguide fibers for either testing the optical component 12 or assembling the optical component 12 into an optical device. In a first approach the lid 62 is disengaged from the base 16 and the component holder 14 is subsequently removed from the receptacle 44. The inherent resiliency of the optical waveguide fibers will unwind the optical waveguide fibers from the component holder without the optical waveguide fibers being touched by either a technician or a machine. A second approach requires that not all of the optical waveguide fibers have been completely withdrawn into the package 60 and that portions of at least some of the optical waveguide fibers extend beyond the confines of the package 60. The optical waveguide fibers are extended by pulling on the ends of the optical waveguide fibers. The optical waveguide fibers are then retracted into the package 60 by selectively rotating the component holder 14. This second approach allows the optical component 12 to undergo testing or characterization while still protected by the package 60.

Figure 4:
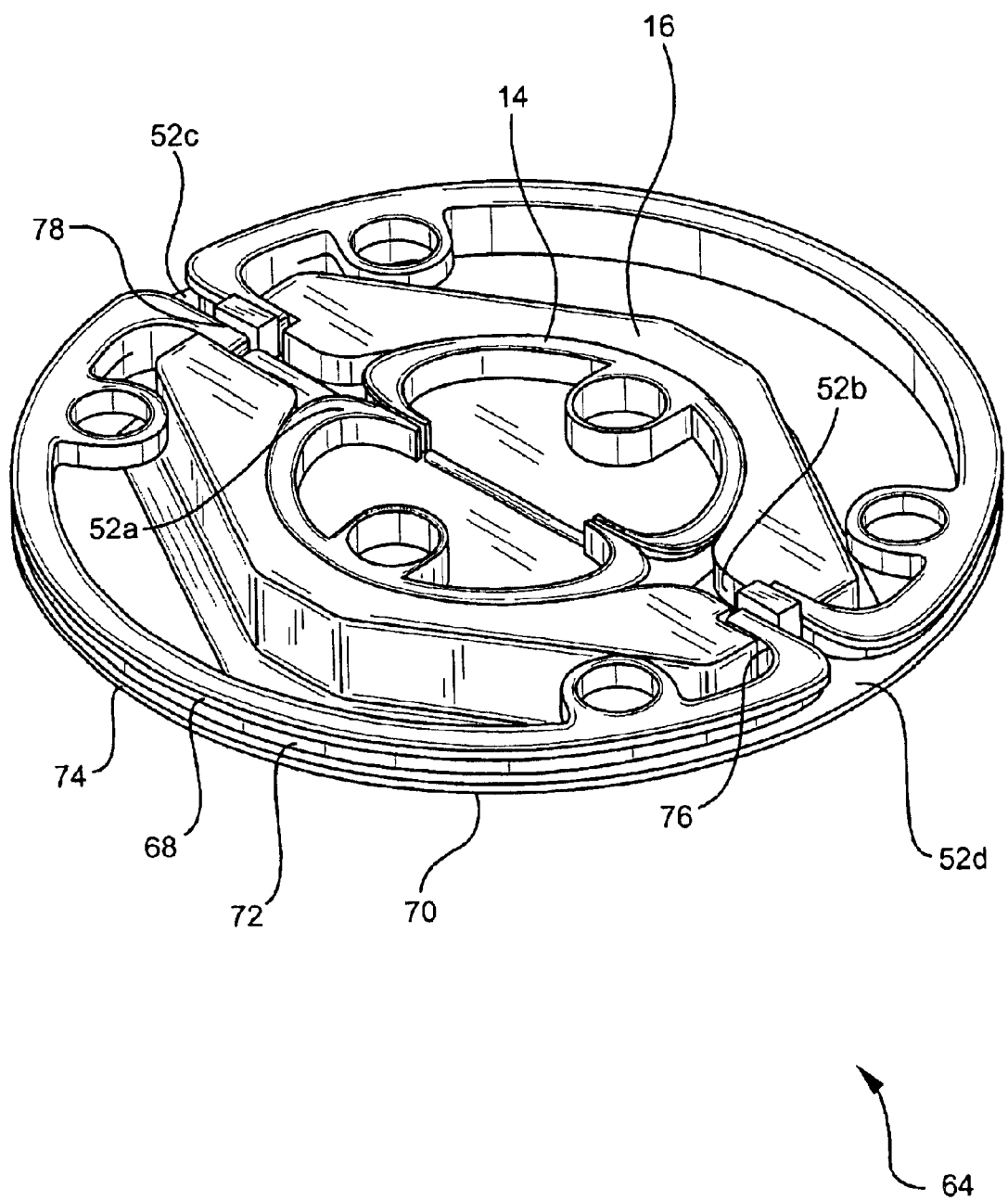
FIG. 4 is a perspective view of a fourth embodiment of the present invention.

Turning to FIG. 4, a packaging platform 64 embodiment of the present invention useful in the manufacturing of optical components, and in particular optical couplers, is shown. The packaging platform 64 includes halo 66, a base 16 and a component holder 14. The halo 66 is removably engageable with the base 16. Similarly, the component holder 14 is removably engageable with the base 16.

The halo 66 includes an upper flange 68, a lower flange 70 and an arcuate surface 72. The upper flange 68, lower flange 70 and arcuate surface 72 define a fiber-winding track 74. The halo may be made from a polymeric material or a metal and may be a casting or a molded piece. Additionally, the halo may be assembled from a collection of sub-pieces as an alternative to the monolithic structure depicted in FIG. 4. The arcuate surface 72 is sized to have a radius of curvature in excess of the minimum bend radius of the optical waveguide fiber to be wound around the halo 66 in the fiber winding track 74.

The halo 66 also includes two fiber guide 52c, 52d that allow optical fibers to pass from the interior of the halo 66 to the fiber winding track 74. The halo 66 includes two engagement members 76, 78 that engage mating surfaces 330, 332 of the base 16.

The base 16 may be made, for example, by injection molding or thermoforming plastic. The base 16 includes a receptacle 44 for receiving the component holder 14. The receptacle 44 is a circular depression the periphery of which includes two fiber guides 52a, 52b. The fiber guides 52a, 52b are located so as to align with the two fiber guides 52c, 52d of the halo 66 when the halo 66 is engaged with the base 16.

The component holder 14 includes an arcuate surface 24 bounded by two radially extending flanges 26, 28 and a mount 30 for the optical component 12. The radially extending flanges 26, 28 in cooperation with the arcuate surface 24 together define a fiber winding track 32.

The mount 30 is disposed in the interior portion of the component holder 14. As shown in FIG. 2 the mount 30 includes opposed resilient fingers that secure the optical component in a predetermined position while still allowing the optical component 12 to be removed from the mount 30 at a later time without damaging either the mount 30 or the optical component. Such a mounting system is advantageous if the optical component 12 is tubular in shape, such as, for example a packaged grating or coupler. Additionally, the fiber guides 52a, 52b may be used as a mount 30b if the optical component 12 is suspended between them.

Turning to FIG. 5, a package 400 for a pump laser 34 is shown. The package 400 includes a base 16 and a rotatable member 14. The base 16 includes a receptacle 44 for the rotatable member 14. The receptacle 44 includes a depressed annular plateau 48. The rotatable member 14 rotates on the depressed annular plateau 48 within the receptacle 44. In one embodiment, the depressed annular plateau 48 includes a multiple depressions 50 and the rotatable member 14 includes at least one protrusion that is configured to engage the multiple depressions 50 thereby providing a detent feature.

As shown in FIG. 5, the base 14 includes receptacles 90, 92 for receiving fiber holders, such as, for example Non-Slip Fiber Holders available from Amherst FiberOptics of Brentwood, Tenn. In another embodiment, the base b14 does not include receptacles for receiving fiber holders The rotatable member 14 includes a planar surface 36. The planar surface 36 includes a mount 30 for the pump laser 34. In one embodiment the mount 30 is a plurality of protrusions 38 shaped and arranged to engage the base of the pump laser 34 and hold the pump laser 34 in a predetermined position. The planar surface 36 is bounded by an optical fiber winding track 32. The optical fiber winding track 32 includes an arcuate surface 24 bounded on its upper and lower edges by two outwardly extending annular flanges 26, 28. The outer edges 82, 84 of the flanges 26, 28 are sized to allow the component holder 14 to slip into and out of the receptacle 44 without binding and to allow the component holder 14 to rotate within the receptacle 44.

The arcuate surface 24 has a radius of curvature that is larger than the minimum bend radius of the optical fibers that will be wound thereon. The optical fiber winding track 32 also includes an of optical fiber guides 42. The optical fiber guide 42 is positioned to allow the optical fiber pigtail 86 of the pump laser 34 to be routed from the pump laser 34 to the optical fiber winding track 32 without bending the optical fiber pigtail 86 through a curve less than the minimum bend radius of the optical fiber pigtail 86.

The component holder 14 also includes an engagement member 88. The engagement member 88 is configured to act in cooperation with a drive system (not shown) to rotates the component holder 14 within the receptacle 44. As shown in FIG. 5 the engagement member 88 is an annulus extending upward from the planar surface 36. This allows an operator to manually rotate the component holder 14 by using a finger or to engage the drive system to rotate the component holder 14. The engagement member 88 is shown in FIG. 4 as being offset from the rotational axis of the component holder 14, however, as will be appreciated by those of ordinary skill in the pertinent art, the engagement member 88 may be located coincident with the rotational axis of the component holder 14. In an embodiment where the engagement member 88 is coincident with the rotational axis of the component holder 14, the rotational axis of the drive system will also be coincident with the rotational axis of the component holder 14 and the engagement member 88 will include a locking mechanism, such as for example a spline or key way to prevent relative rotation between the drive system and the component holder 14.

In one embodiment, the engagement member 88 is magnetically couplable to the drive system and the drive system rotates the component holder 14 by way of this magnetic interconnection.

The package 400 for a pump laser 34 may be used in the following manner. The component holder 14 is placed in the receptacle 44. The fiber guide 42 is substantially aligned with the fiber passageway 52. A pump laser 34 is secured to the component holder 14 using the mount 30. The optical fiber pigtail 86 is routed through the fiber guide 42 and the fiber passageway 52 with the excess optical fiber extending beyond the base 16. Care must be taken that the optical fiber pigtail 86 is not bent through an arc having a radius of curvature smaller than the minimum bend radius of the optical fiber pigtail 86. The component holder 14 is then rotated, thereby winding the optical fiber pigtail 86 about the component holder 14 in the fiber winding track 32. Alternatively, a fiber holder (not shown) may be placed in the optical fiber holder receptacle 92 and when a predetermined length of the optical fiber pigtail 86 has been wound onto the component holder 14, the fiber holder may be engaged thereby gripping the optical fiber pigtail 86. The use of a fiber holder is advantageous because fiber holders are used in the fusion splicing of optical waveguide fibers. Thus the use of a fiber holder and the ability to selectively unwind lengths of the optical fiber pigtail 86 while the remainder of the optical fiber pigtail 86 remains within the fiber winding track 32 decreases the potential for damage to the optical fiber pigtail 86. The pump laser 34 may be readied for assembly into an optical device, such as for example an optical amplifier by removing the component holder 14 from the base 16. The inherent resiliency of the optical fiber pigtail 86 will unwind the optical fiber pigtail 86 without the need for a technician to touch the optical fiber pigtail 86.

Figure 6:
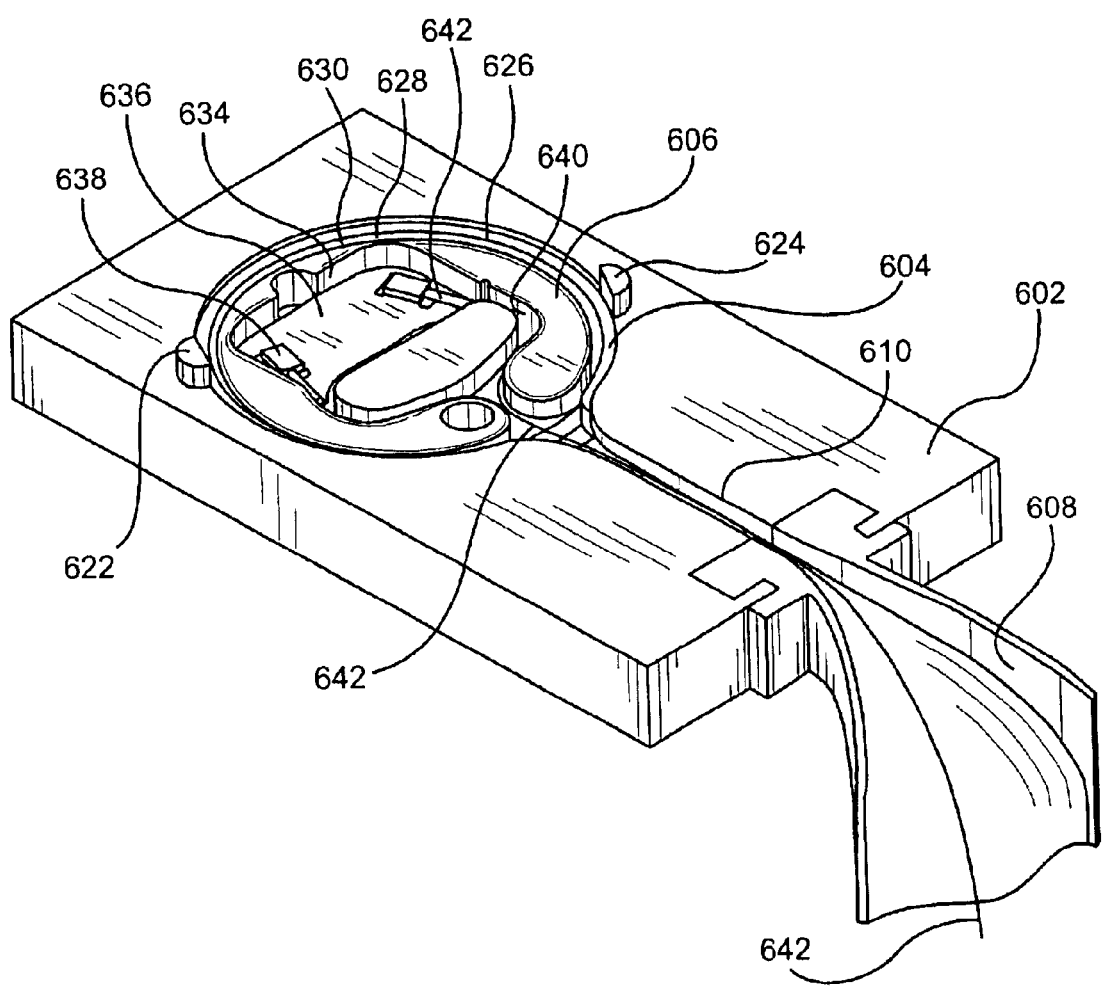
FIG. 6 is a perspective view of another embodiment of the present invention.

Turning to FIG. 6, a pump laser card assembly fixture 600 embodiment of the present invention is shown. In this embodiment, the present invention is used to wrap the optical fibers of a pump laser about the periphery of a rotatable component holder 606. The pump laser card assembly fixture 600 includes a base 602, a component holder housing 604, a rotatable component holder 606 and an input fiber tray 608.

Figure 7:
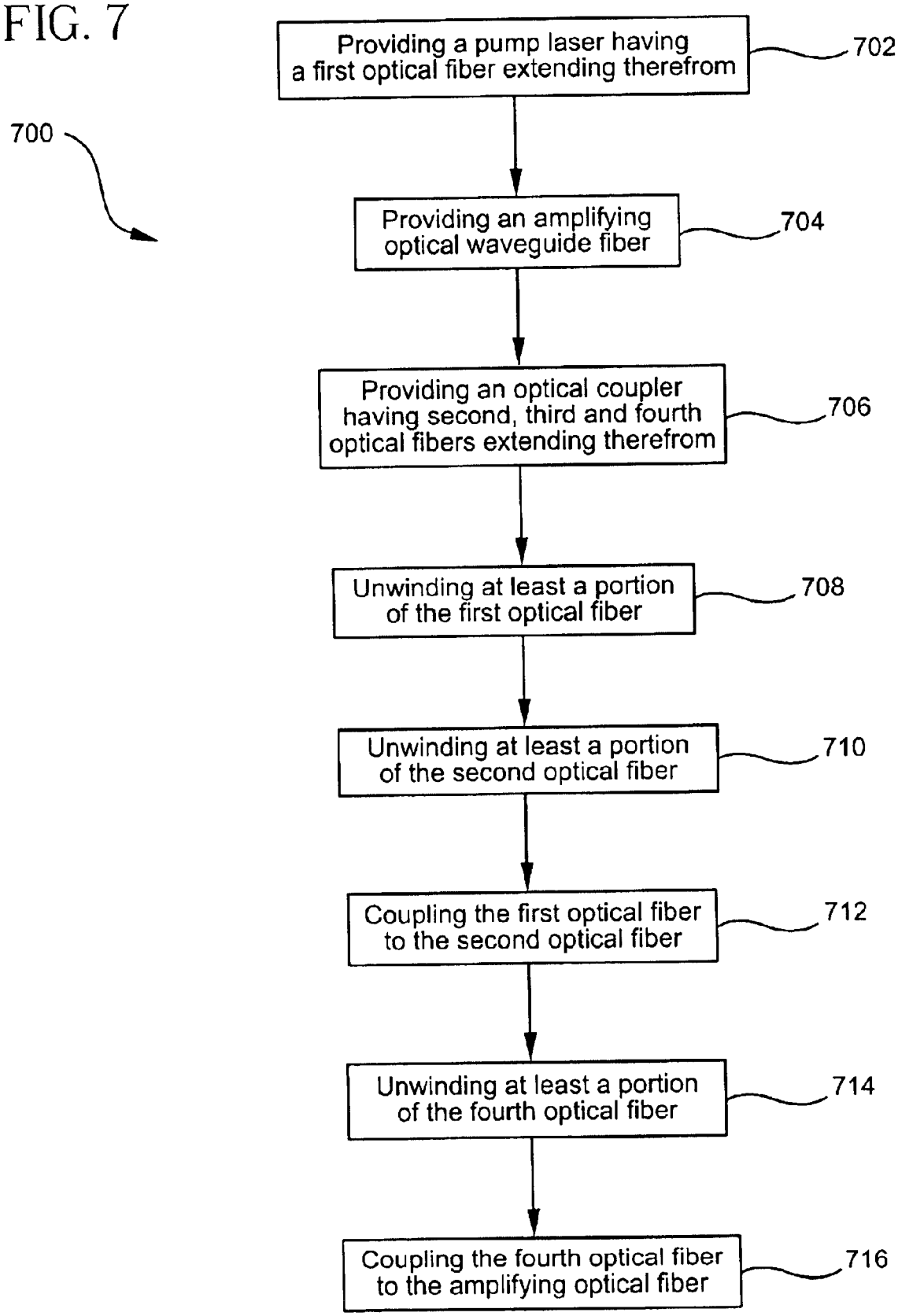
FIG. 7 is a flowchart showing the optical amplifier fabrication steps of one embodiment of the present invention in block diagram form.
Figure 10:
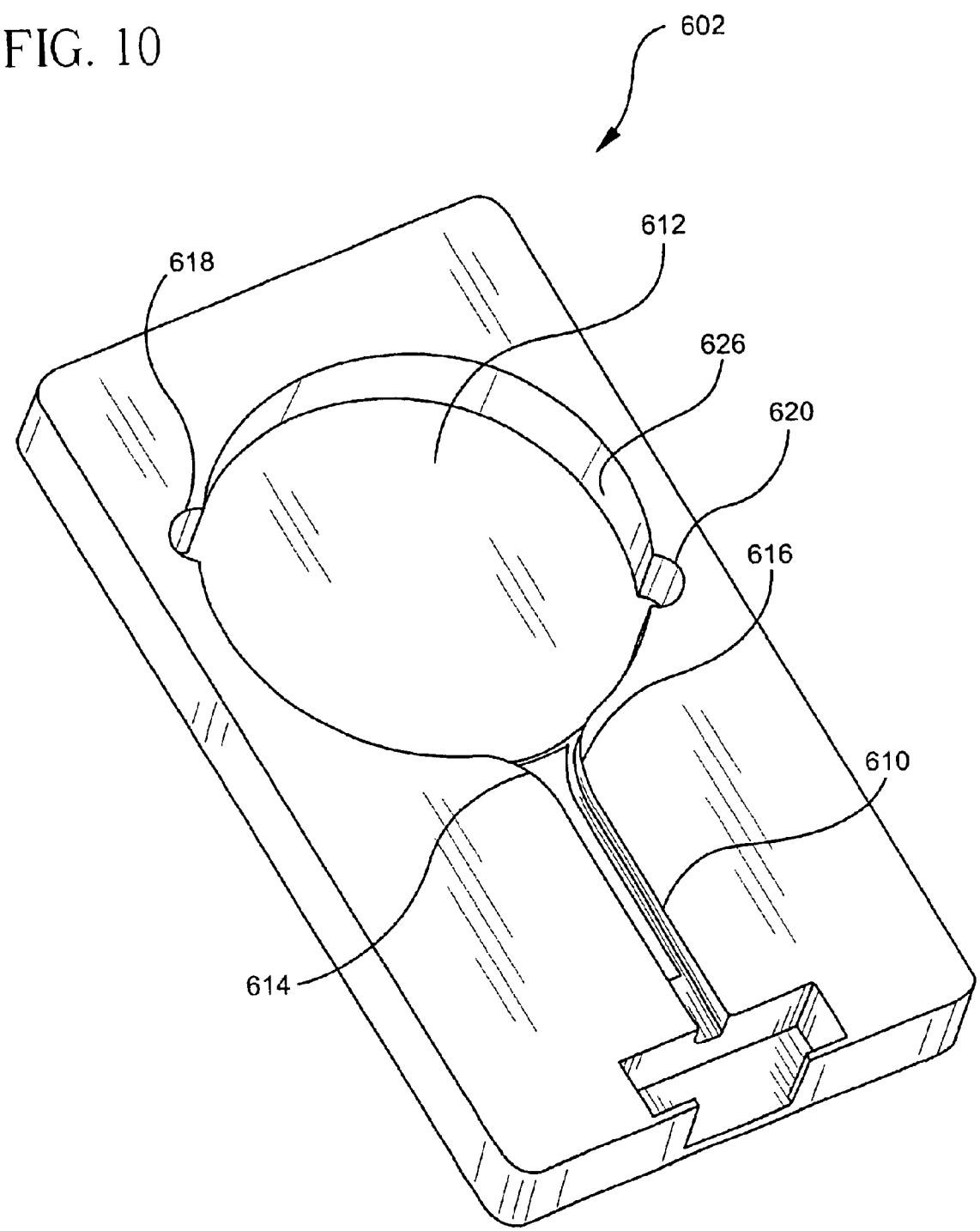
FIG. 10 is a perspective view of the base of FIG. 6.

The base 602, more clearly understood by reference to FIG. 10, includes circular depression 612 into which a component holder housing 604 is inserted. The base 602 includes a means for preventing relative rotational motion between the base 602 and the component holder housing 604. As shown in FIG. 6 and FIG. 7 the means for preventing relative rotational motion between the base 602 and the component holder housing 604 may include recesses 618, 620 in the side wall of the circular depression 612 that engage protrusions 622, 624 on the component holder housing 604.

The base 602 also includes a fiber passageway 610. The fiber passageway 610 connects the input fiber tray 608 to a circular depression 612. Although, FIG. 6 includes a fiber input tray 608, it will be apparent to those skilled in the art that this is not a necessary feature of the invention. As will be apparent to those skilled in the art the optical fibers may be allowed to lay freely on a work surface, be wound about a spool, or cascade over the edge of a table. The side walls 614, 616 of the end of the fiber passageway 610 that opens into the circular depression 612 form arcuate surfaces each having a radius of curvature that is larger than the minimum bend radius of the optical fibers to be wound about the periphery of a rotatable component holder 606. The base 602 may be, for example, an injection molded plastic part, a thermoformed plastic part, machined from a metal blank, or a formed metal piece.

The component holder housing 604 includes an arcuate surface 626. The arcuate surface 626 defines a receptacle 628 for receiving the rotatable component holder 608.

The rotatable component holder 608 includes an arcuate surface 630 having a radius of curvature less than that of the arcuate surface 626 that defines the receptacle 628. The rotatable component holder 608 includes an annular flange 630 extending radially from the arcuate surface of the rotatable component holder 608. The circumference of the annular flange 630 abuts the arcuate surface 626 of the receptacle 628. The annular flange 630 and the two arcuate surfaces 626, 630 define a fiber-winding track 632. The rotatable component holder 608 includes a well 634 for holding a substrate 636 with an optical component 638 mounted thereon. The rotatable component holder 608 also includes fiber passageways 640 that lead from the well 634 to the fiber-winding track 632. The rotatable component holder 608 is rotatable within the component holder housing 604.

In use a substrate 636 is placed in the well 634. An optical component 638 may either be already mounted to the substrate 636 or mounted to the substrate 636 after the substrate 636 is placed in the well 634. It will be apparent to those of ordinary skill in the art that more that one optical component may be mounted to the substrate 636 and that the present invention is not limited to a substrate 636 with a single optical component 638 mounted thereon. The optical component 638 includes at least one optical waveguide fiber 642 extending therefrom.

The at least one optical waveguide fiber 642 is placed so as to extend from the well 634 into the fiber passageways 640 and through an opening 644 in the arcuate surface 626 of the component holder housing 604 that is aligned with the fiber passageway 610. The at least one optical fiber 642 extends into the fiber passageway 610. If the at least one optical fiber 642 is longer than the fiber passageway 610 the base may be equipped with an input fiber holding tray 608 to help prevent damage to the at least one optical fiber 642.

In operation, the rotatable component holder 608 is rotated within the component holder housing 604. This rotation causes the at least one optical fiber 642 to be wound about the rotatable component holder 608 within the fiber winding track 632. The component holder housing 604, with the rotatable component holder 608 still contained within, may be removed from the base 602 allowing the substrate, mounted optical components and wound optical fiber to be transported in a manner that reduces the risk of damage to the optical device.

The at least one optical fiber 642 may be unwound from the rotatable component holder 608, by removing the rotatable component holder 608 from the component holder housing 604 thereby allowing the at least one optical fiber 642 to uncoil as a function of its inherent resiliency. Alternatively, the at least one optical fiber 642 may be unwound from the rotatable component holder 608, by rotating the rotatable component holder 608 in the opposite direction from that used to wind the at least one optical fiber 642 about the rotatable component holder 608.

Figure 8:
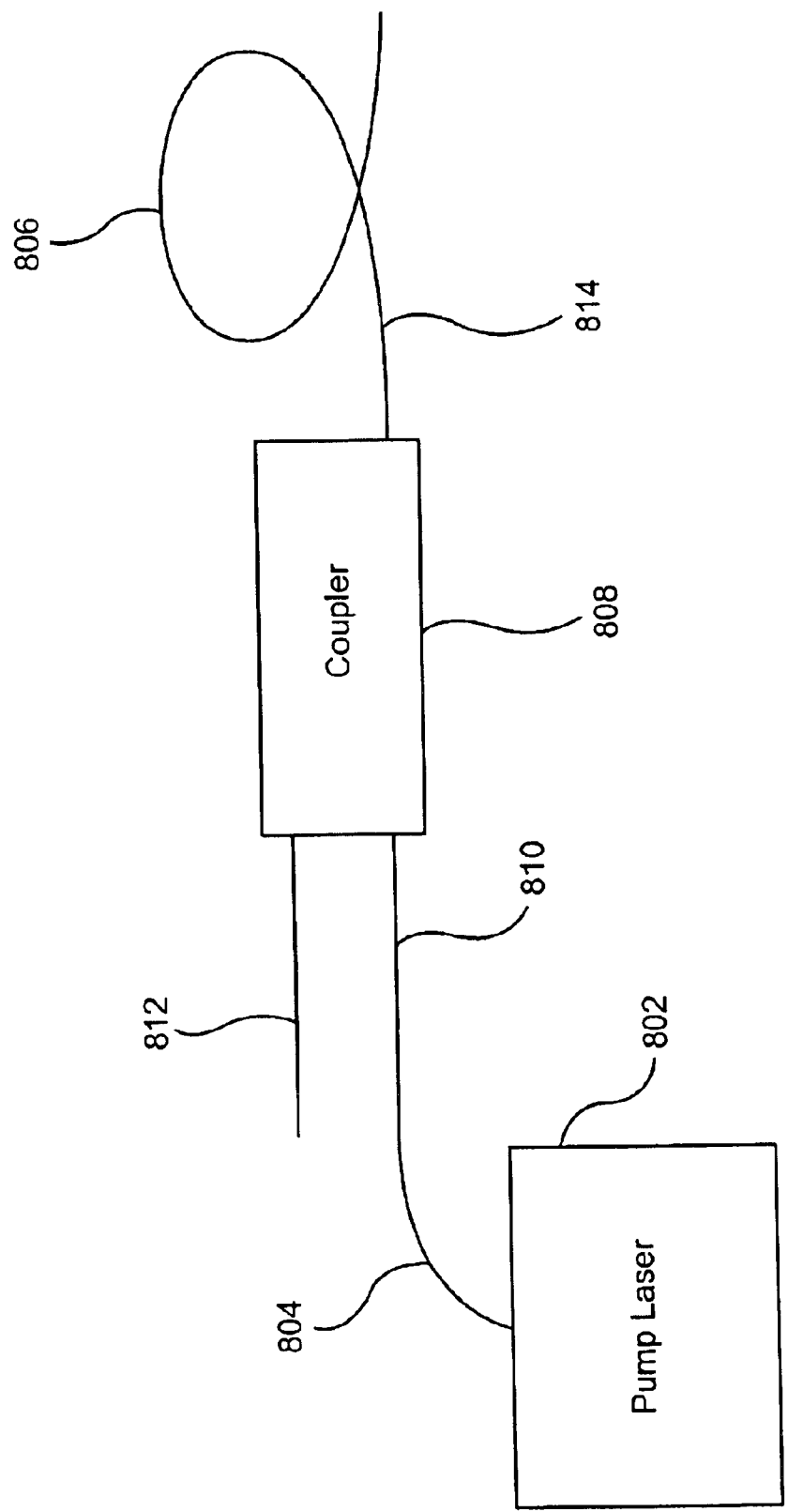
FIG. 8 is a schematic diagram of an optical amplifier.
Figure 9:
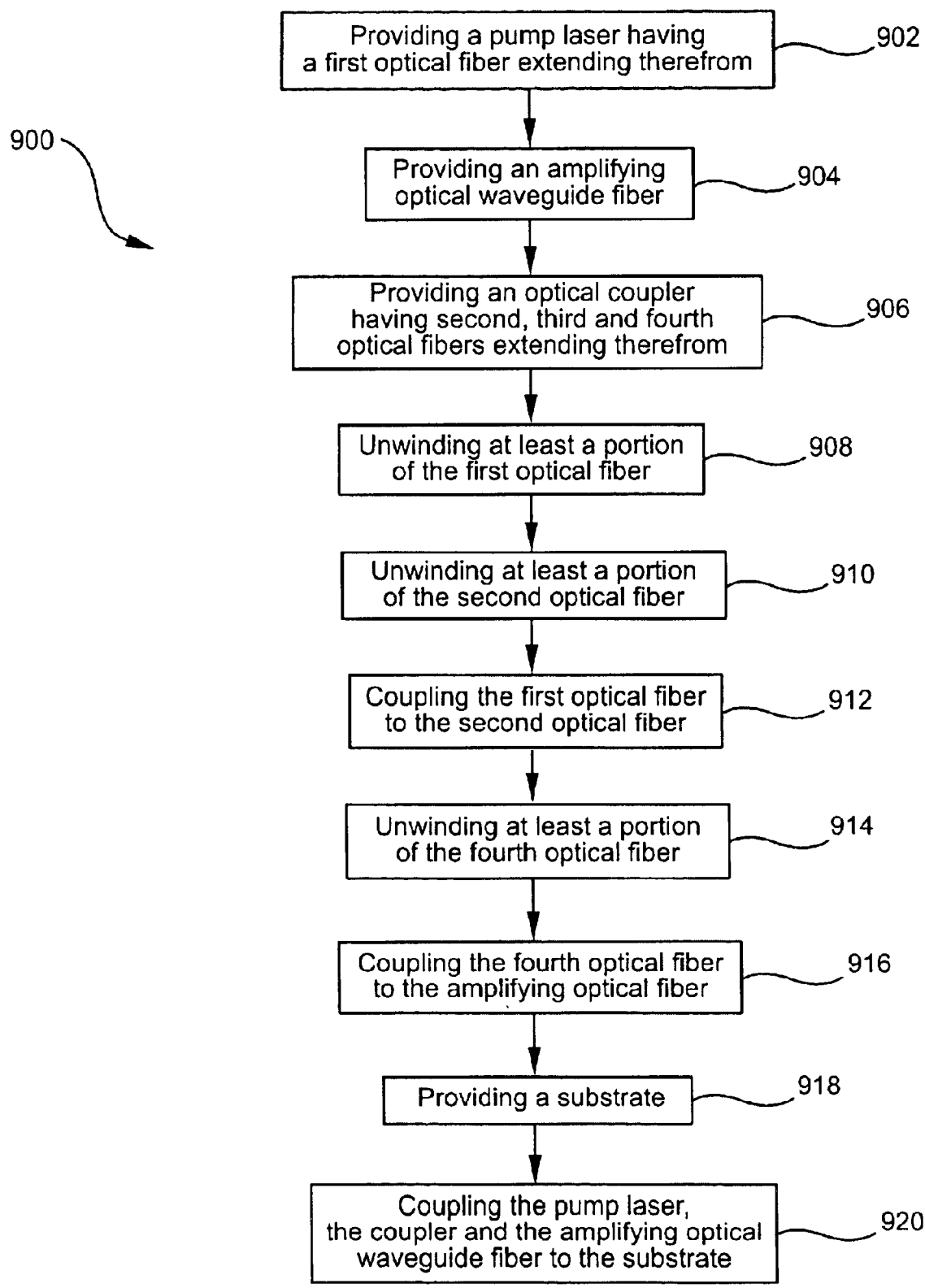
FIG. 9 is a flow chart showing the optical amplifier fabrication steps of one embodiment of the present invention in block diagram form.

Turning to FIG. 7, the present invention includes a method 700 for assembling an optical amplifier. The method 700, may be better understood by referring the schematic depiction of optical amplifier of FIG. 8.

The method 700 of assembling an optical amplifier includes the step 702 of providing a pump laser, such as, for example a 980 nm Standard Pump Laser, available from Corning Lasertron, Inc., of Bedford, Mass. The pump laser has a first optical waveguide fiber extending therefrom. The pump laser is detachably coupled to a first component holder, such as, for example component holder 14 as shown in FIG. 4. The first optical waveguide fiber is wound about the first component holder, thus ensuring that the first optical fiber is not bent through a radius tighter than the minimum bend radius of the first optical fiber.

The method 700 of assembling an optical amplifier further includes the step 704 of providing an amplifying optical waveguide fiber having a core doped with rare earth elements, such as, for example one of the Erbium doped fibers available from Corning OTI Sp.A. of Milan, Italy. The amplifying optical waveguide fiber possesses the property that when the core is irradiated by light having a first wavelength the strength of an optical signal having a second wavelength propagating through the optical waveguide fiber is amplified.

The method 700 of assembling an optical amplifier further includes the step 706 of providing an optical coupler, such as, for example a Coming Multiclad 980/1550 1×2 Dual Fiber WDM, available from Coming Incorporated of Corning, N.Y. The coupler has a first end and a second end, a second and a third optical waveguide fiber extend from the first end a fourth optical waveguide fiber extends from the second end. The optical coupler is detachably coupled to a second component holder, such as, for example the component holder 40 shown in FIG. 2. The second, third and fourth optical waveguide fibers are wound about the second component holder so that the second, third and fourth optical waveguide fibers are not bent through a radius smaller than the minimum bend radii of the respective fibers.

The method 700 of assembling an optical amplifier further includes the step 708 of unwinding at least a portion of the first optical waveguide fiber from the first component holder.

The method 700 of assembling an optical amplifier further includes the step 710 of unwinding at least a portion of the second optical waveguide fiber from the second component holder.

The method 700 of assembling an optical amplifier further includes the step 712 of coupling the first optical waveguide fiber to the second optical waveguide fiber, such as, for example by fusing the first optical waveguide fiber to the second optical waveguide fiber. The first and second optical waveguide fibers may be fused to one another using an electric arc fusion splicer, such as for example an Ericcson FSU 995, available from Amherst FiberOptics of Brentwood, Tenn., a laser, or any of the other techniques known to those skilled in the art of splicing optical waveguide fibers to one another.

The method 700 of assembling an optical amplifier further includes the step 714 of unwinding at least a portion of the fourth optical waveguide fiber from the second component holder.

The method 700 of assembling an optical amplifier further includes the step 716 of coupling the fourth optical waveguide fiber to the amplifying optical waveguide fiber.

In an additional embodiment, the present invention includes a method 900 for assembling an optical amplifier.

The method 900 further includes the step 918 of providing a substrate. The substrate may, for example include a planar surface or be a cylinder.

The method 900 further includes the step 920 of coupling the pump laser, coupler and amplifying fiber to the substrate.

When the substrate is a cylinder, the step 920 of coupling the pump laser, coupler and amplifying fiber to the substrate includes coupling the pump laser, coupler and amplifying fiber to the outer surface of the cylinder and winding the first, second, third and fourth optical fibers around the outer surface of the cylinder. The radius of curvature of the outer surface of the cylinder is greater than the minimum bend radii of the first, second, third and fourth optical fibers, thereby ensuring that the first, second, third and fourth optical fibers are not formed into a curve having a radius smaller than their respective minimum bend radii. Additionally, the amplifying optical fiber may be coiled about the outer surface of the cylinder, thereby providing an optical amplifier assembly in which the optical waveguide fibers are prevented from being bent through a radius smaller than their respective minimum bend radii.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A package for an optical component comprising:
   a base having a receptacle, said base defining an axis of rotation; and
   a rotatable member removably engageable with said base and disposed within said receptacle, said rotatable member including:
       a fiber winding surface; and
       another receptacle, said another receptacle being configured to receive the optical component;
   wherein the optical component has a length of optical waveguide fiber extending therefrom; and
   wherein said rotatable member is rotatable about said axis of rotation, wherein said base includes an arcuate surface, and said component holder includes a fiber winding surface, wherein said arcuate surface and said fiber winding surface define a volume in which at least a portion of the optical waveguide fiber is contained, said package further including a lid removably engageable with said base, wherein said component holder is disposed between said base and said lid, and wherein said lid is in a first position, said rotatable member is confined to substantially rotational motion within said receptacle.

2. A package for an optical component comprising:
 a base, said base defining an axis of rotation; and
 a rotatable member removably engageable with said base, said rotatable member including:
  a fiber winding surface; and
  a receptacle, said receptacle being configured to receive the optical component;
 wherein the optical component has a length of optical waveguide fiber extending therefrom; and
wherein said rotatable member is rotatable about said axis of rotation, said package further including a magnet member coupled to said component holder.

3. The package of claim 2 wherein said magnetic member is offset from the rotational axis of said component holder.

4. A package for an optical component having an optical waveguide fiber extending therefrom, said package comprising:
 a base, said base including:
  a first fiber guide; and
  a receptacle;
 a rotating member removably engageable with said receptacle, said rotating member including an optical fiber winding track;
 wherein said rotating member is rotatable within said receptacle; and
wherein said optical component is detachably coupled to said rotating member, wherein said rotating member includes:
 an optical component holding compartment; and
 a second fiber guide disposed to guide optical waveguide fibers from said optical component holding compartment onto said optical waveguide fiber winding track;
 wherein said optical waveguide fiber winding track disposed about said optical component holding compartment; and
 wherein the optical component is disposed within said optical component holding compartment.

5. The package of claim 4 wherein said optical component is a laser.

6. A package for an optical component having an optical waveguide fiber extending therefrom, said package comprising:
 a base, said base including:
  a first fiber guide; and
  a receptacle;
 a rotating member removably engageable with said receptacle, said rotating member including an optical fiber winding track;
 wherein said rotating member is rotatable within said receptacle; and
wherein said optical component is detachably cooled to said rotating member, wherein said base includes a first surface, wherein said rotating member includes a second surface, said second surface rotatable on said first surface, wherein said first surface includes a plurality of recesses and said second surface includes at least one protrusion, said plurality of recesses and said at least one protrusion disposed so as to interact to prevent undriven rotation of said rotating member.

7. The package of claim 6
 wherein said receptacle constrains said rotating member to rotation about a rotational axis; and
 wherein said plurality of depressions are disposed in a circular pattern about said rotational axis.

8. A method for assembling an optical device comprising the steps of:
 providing a plurality of optical components, each of the plurality of optical components having at least one optical waveguide fiber extending therefrom, wherein each of the plurality of optical component is detachably mounted to a rotatable component holder, wherein each of the at least one optical waveguide fibers corresponding to each of the plurality of optical components is wound around the rotatable component holder; and
 connecting the plurality of optical components in a predetermined relationship one to another thereby forming an optical device;
 wherein the step of connecting the plurality of optical components includes the step of unwinding at least a portion of portion of at least one of the at least one optical waveguide fibers from the rotatable component holder around which the at least one optical waveguide fiber is wound;
 wherein the step of connecting the plurality of optical components includes the step of coupling at least two of the at least one optical fibers extending from each of the plurality of optical components to one another.

9. The method of claim 8 wherein the optical device is an optical amplifier.

10. The method of claim 8 further including the steps of:
 unwinding each of the at least one optical fibers extending from each of the plurality of optical components from the rotatable component holder to which the optical component is mounted;
 detaching each of the plurality of optical components from its respective rotatable component holder;
 providing a cylinder having a plurality of optical component mounting locations distributed in a predetermined pattern about the outer surface of the cylinder; and
 winding the optical device about the cylinder wherein each of the plurality of optical components engages one of the plurality of optical component mounting locations.

11. A method for packaging an optical component having at least one optical fiber extending therefrom comprising the steps of:
 providing a component holder, the component holder including a surface for winding the at least one optical fiber on, wherein said surface is an arcuate surface having a radius of curvature larger than the minimum bend radius of the at least one optical fiber;
 placing the optical component into removable engagement with the component holder;
 providing a housing, the housing configured to removably receive the component holder, wherein the housing includes an arcuate surface that in cooperation with the arcuate surface defines a fiber storage region;
 placing the component holder into the housing; and
 rotating the component holder, the component holder being magnetically coupled to a winding device, thereby winding at least a portion of the at least one optical fiber about said arcuate surface, thereby placing at least a portion of the at least one optical fiber within the fiber storage region.

12. The method of claim 11 further including the steps of:

providing a lid, the lid engageable with the housing;

placing the lid into engagement with the housing thereby capturing the component holder between the lid and the housing.

13. The method of claim 11 further including the steps of:

providing a fiber holder; and coupling an end of the at least one optical fiber thereto.

* * * * *

UNITED STATES PATENT AND TRADEMARK OFFICE
CERTIFICATE OF CORRECTION

PATENT NO.   : 6,795,633 B2
DATED        : September 21, 2004
INVENTOR(S)  : Michael A. Joseph, II It is certified that error appears in the above-identified patent and that said Letters Patent is hereby corrected as shown below:

<u>Column 13,</u>
Line 59, the word "cooled" should be -- coupled --.

Signed and Sealed this

First Day of February, 2005

JON W. DUDAS
*Director of the United States Patent and Trademark Office*